(12) United States Patent
Thomson (10) Patent No.: US 7,436,187 B2
(45) Date of Patent: Oct. 14, 2008

(54) CONDUCTANCE CONTROL FOR DETECTING FOAM AND/OR AN UNSTABLE FLUID LINE

(75) Inventor: Christopher J. Thomson, Palatine, IL (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 11/031,525

(22) Filed: Jan. 7, 2005

(65) Prior Publication Data

US 2006/0152225 A1    Jul. 13, 2006

(51) Int. Cl.
*G01N 27/02*    (2006.01)

(52) U.S. Cl. .................. 324/446; 324/694; 324/696

(58) Field of Classification Search .......... 324/446, 324/694, 696
See application file for complete search history.

(56) References Cited

U.S. PATENT DOCUMENTS

| | | | |
|---|---|---|---|
| 1,665,793 A | 4/1928 | Sandborqh | 392/327 |
| 1,683,050 A | 9/1928 | Penzold | 392/338 |
| 1,902,842 A | 3/1933 | Eaton | 392/326 |
| 3,937,920 A | 2/1976 | Gundacker | 392/327 |
| 3,944,785 A | 3/1976 | Eaton-Williams | 392/326 |
| 5,220,514 A * | 6/1993 | John | 702/53 |
| 5,501,102 A | 3/1996 | Williamson | 73/304 R |
| 5,600,997 A | 2/1997 | Kemp | 73/290 V |
| 5,603,238 A | 2/1997 | Williamson | 73/304 R |
| 5,739,504 A | 4/1998 | Lyons | 219/494 |
| 5,775,164 A | 7/1998 | Kishi | 73/304 R |
| 6,078,729 A | 6/2000 | Kopel | 392/402 |
| 6,207,045 B1 | 3/2001 | Jiang | 210/86 |
| 6,223,595 B1 | 5/2001 | Dumbovic | 219/481 |
| 6,390,027 B1 | 5/2002 | Lyons | 122/14.2 |
| 6,571,625 B2 | 6/2003 | Thomson | 73/304 C |
| 6,634,229 B1 | 10/2003 | Kazkaz | 73/304 R |
| 6,666,086 B2 | 12/2003 | Colman | 73/304 C |
| 6,904,800 B2 * | 6/2005 | Merwin | 73/304 R |
| 7,243,540 B2 * | 7/2007 | Merwin | 73/304 C |
| 2005/0120792 A1 * | 6/2005 | Merrild | 73/303 |

* cited by examiner

*Primary Examiner*—Vincent Q. Nguyen

(57) ABSTRACT

A method and apparatus is provided for detecting and responding to foaming of a fluid being heated, and more particularly, for operating a device having a container with fluid therein, wherein a resistance of an electrical path from a probe is measured through the fluid to a ground resistance. In operation, a control probe having a foam detecting conductance microcontroller module shuts off the device based on a predetermined volatility/variability of two or more resistance readings, because such may indicate the presence of foam in the fluid.

27 Claims, 9 Drawing Sheets

A Level Sensing System

FIG. 1 : A Steam Boiler
(PRIOR ART)

FIG. 2(b): Base of Conductance Probe
(PRIOR ART)

FIG. 2(a): Conductance Probe
(PRIOR ART)

FIG. 2(c): Cross-section of Conductance Probe in FIG. 2(a)
(PRIOR ART)

FIG. 3(a) : A Level Sensing Device Assembly

FIG. 3(b) : A Level Sensing Device Assembly

FIG. 4 : A Level Sensing System

| Foaming Burnham Oil-Fired Boiler | | | | |
|---|---|---|---|---|
| Cumulative seconds | Seconds | Minutes | Seconds | Burner |
| 0 | | | | |
| 1965 | 1965 | 32 | 45 | On |
| 2064 | 99 | 1 | 39 | Off |
| 3186 | 1122 | 18 | 42 | On |
| 3286 | 100 | 1 | 40 | Off |
| 4482 | 1196 | 19 | 56 | On |
| 4582 | 100 | 1 | 40 | Off |
| 5782 | 1200 | 20 | 0 | On |
| 5882 | 100 | 1 | 40 | Off |
| 7081 | 1199 | 19 | 59 | On |
| 7180 | 99 | 1 | 39 | Off |
| 8406 | 1226 | 20 | 26 | On |
| 8506 | 100 | 1 | 40 | Off |
| 9672 | 1166 | 19 | 26 | On |
| 9769 | 97 | 1 | 37 | Off |
| 10910 | 1141 | 19 | 1 | On |
| 11009 | 99 | 1 | 39 | Off |
| 12138 | 1129 | 18 | 49 | On |
| 12236 | 98 | 1 | 38 | Off |
| 13435 | 1199 | 19 | 59 | On |
| 13535 | 100 | 1 | 40 | Off |
| 14724 | 1189 | 19 | 49 | On |
| 14823 | 99 | 1 | 39 | Off |

*FIG. 10*

| Clean Burnham Oil-Fired Boiler | | | | |
|---|---|---|---|---|
| Cumulative seconds | Seconds | Minutes | Seconds | Burner |
| 15 | | | | |
| 1736 | 1721 | 28 | 41 | On |
| 1826 | 90 | 1 | 30 | Off |
| 2609 | 783 | 13 | 3 | On |
| 2699 | 90 | 1 | 30 | Off |
| 3510 | 811 | 13 | 31 | On |
| 3598 | 88 | 1 | 28 | Off |
| 4364 | 766 | 12 | 46 | On |
| 4451 | 87 | 1 | 27 | Off |
| 5199 | 748 | 12 | 28 | On |
| 5287 | 88 | 1 | 28 | Off |

*FIG. 9*

CONDUCTANCE CONTROL FOR DETECTING FOAM AND/OR AN UNSTABLE FLUID LINE

BACKGROUND OF THE INVENTION

1. Field of Invention

The present invention relates to a method and apparatus for sensing a fluid level in a device; and more particularly to a method and apparatus for sensing a fluid level in a steam boiler during operation in order to control the water level therein.

2. Description of Related Art

Conductance style probes are installed in boilers in order to control the water level in the boiler and to prevent the burner from firing if the water level is too low. When water is below the probe, the probe has low conductance and the probe control unit signals the water feeder or pump to turn on and feed water into the boiler. In addition, the burner is prevented from firing because the water level is too low. If the probe is in water, the conductance is high and the probe control unit signals the water feeder or pump to turn off. In addition, the burner is now allowed to fire, if required.

Figure 1:
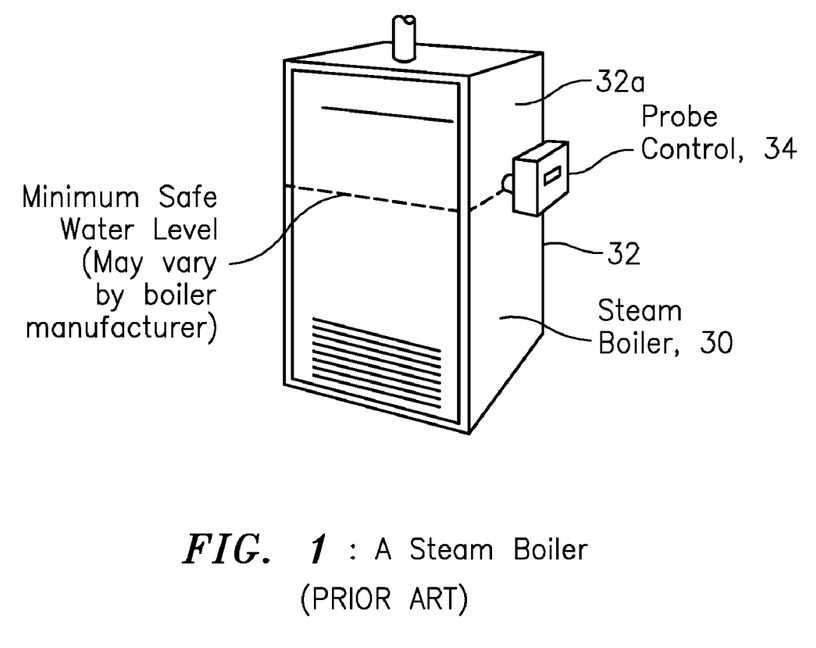
FIG. 1 shows a diagram of a known steam boiler.

In particular, FIG. 1 shows a steam boiler 30 having a container 32 with a probe control 34 arranged on a side wall 32a thereof. The probe control 34 has a conductance probe (See FIGS. 2(a) to (c)) arranged therein and inside the side wall 32a. The conductance probe monitors the water level in the container 32 to make sure a minimum safe water level is maintained therein.

Figure 2A:
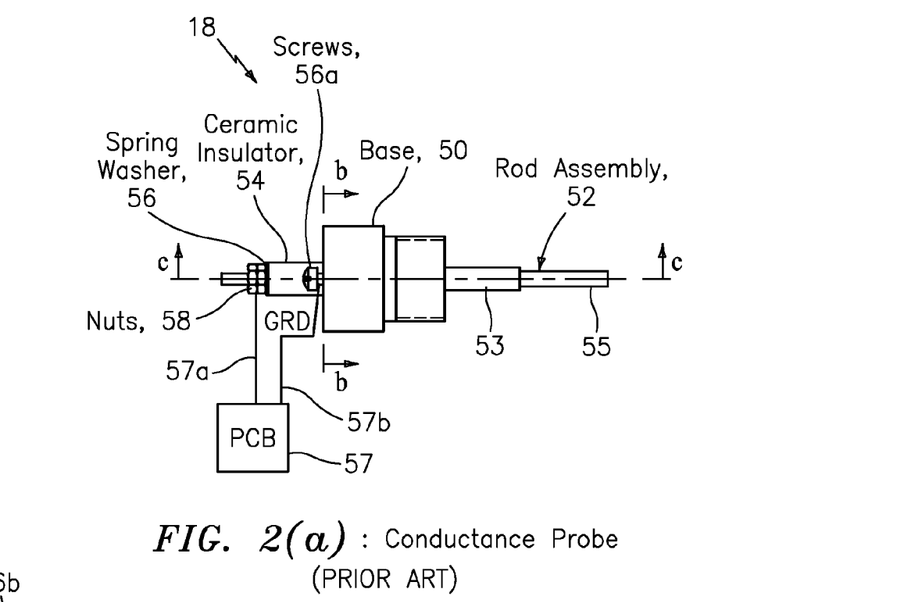
FIG. 2(a) shows a partial assembly drawing of a known conductance probe for use in the known steam boiler shown in FIG. 1.
Figure 2B:
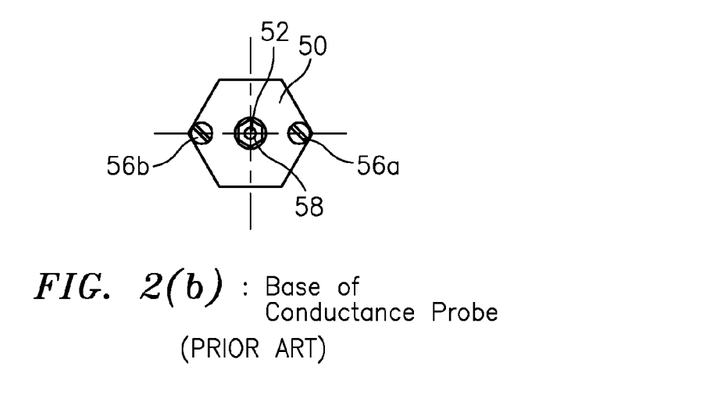
FIG. 2(b) shows a partial assembly drawing of a side view along lines b-b of the conductance probe shown in FIG. 2(a).
Figure 2C:
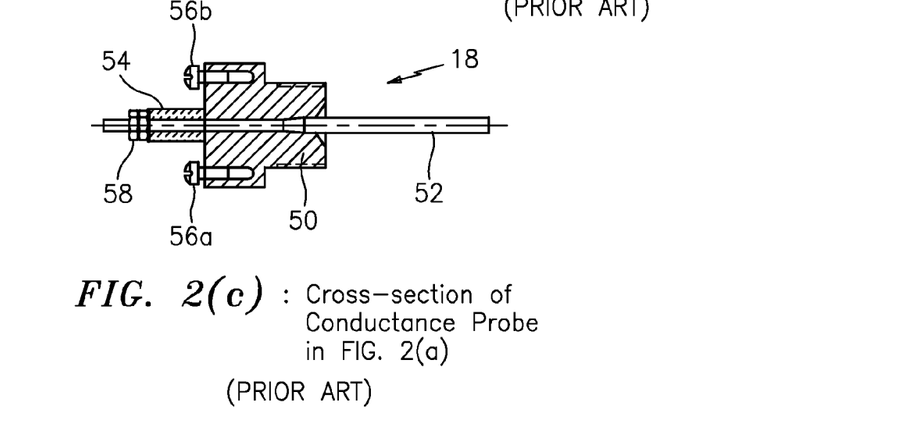
FIG. 2(c) shows a partial assembly drawing of a cross-section along lines c-c of the conductance probe shown in FIG. 2(a).

FIGS. 2(a), 2(b) and 2(c) show a conductance probe 18 that may be used in the steam boiler 30 in FIG. 1, which includes a base 50, an assembly rod 52, a ceramic insulator 54, a spring washer 56, screws 56a, 56b and nuts 58. The assembly rod 52 is a conducting element partially wrapped with Teflon 53 for providing an electric insulator between the base 50 and the rod assembly 52, leaving a conducting tip 55 as shown. The operation of the conductance probe 18 in relation to the device 30 (Figure is known in the art. By way of example, when installed in a boiler or other suitable device, a wire 57a from a printed circuit board (PCB) 57 in the probe control 18 is coupled between the nuts 58 and the base 50, and a pair of wires such as 57b are coupled from the screws 56a, 56b to ground. When the probe 18 comes into contact with the fluid, a conductance signal is provided to the PCB 57 via the wire arrangement 57a, 57b. The conductance probe may also take the form of a capacitive based probe which is known in the art having a layer of Teflon or other suitable insulator or dielectric material covering the whole tip.

One known technique for monitoring the water level uses a threshold value to determine where the water line is. The problem with this approach is that foam on top of the water line can appear as water to a conductance sensor, if the foam is conductive. This technology overcomes this problem by detecting changes in the stability of the conductance, allowing it to determine when the sensor is near the liquid/foam interface.

Other known techniques for monitoring the water level uses a timing circuit to shut down the process in order to let the foam settle. For example, U.S. Pat. Nos. 5,739,504 and 6,390,027, both issued to Lyon et al., both require periodically turning off a heater for a predetermined time period independent of any detected foam condition, whereas after detecting a foam condition and turning off the device, you wait for a predetermined number of consecutive in-water readings. However, these approaches cause inefficiencies in the process, since the process cannot run 100% of the time.

Moreover, while the '504 and '027 patents disclose shutting off the device periodically to minimize the effects of foam, they do not disclose techniques for detecting the presence of foam in the container.

There are many other known devices related to detecting and using fluid levels to control boilers and other devices, such as humidifiers. Of these patents, U.S. Pat. No. 6,078,729, issued to Kopel, relates to using foam detection to provide fluid level control. In the '729 patent, when a capacitive sensor detects normal water levels and a conductive foam detector begins conducting, then a controller concludes that foam is present, thereby triggering corrective action. See the '729 patent, column 3, lines 62-67. However, there is no disclosure in the '729 patent to monitor the volatility/variability of two or more conductive resistance readings. Other known patents do not relate to controlling the operation of the device based on the detection of foam, but instead relate to controlling the operation of a device based on various techniques for monitoring the water level in boilers and other devices having containers of fluid-like humidifiers.

In view of the aforementioned, there is a need in the art for a method and apparatus for sensing a fluid level in a device and controlling the device based on detecting the presence an undesirable foam or unstable fluid line, especially for use in steam boilers and other devices for heating fluids.

SUMMARY OF INVENTION

In its broadest sense, the present invention provides both a method and apparatus for detecting and responding to foaming of a fluid being heated, and more particularly, for operating a device having a container with fluid therein, wherein a resistance of an electrical path from a probe is measured through the fluid to a ground resistance. In operation, the method includes shutting off the device with a probe control having a foam detecting conductance microcontroller module based on a predetermined difference between two or more resistance readings.

According to the present invention, the predetermined difference may be based on a predetermined volatility/variability of two or more resistance readings, because such may indicate the presence of foam in the fluid. By way of example, the volatility/variability may be determined by finding a predetermined number of consecutive resistance readings which deviate by more than a predetermined percentage.

Moreover, according to the present invention, the device may also be shut off based on a determination of a total of a predetermined number of out-of-water conditions within a predetermined period of time.

Moreover still, according to the present invention, the device may also be shut off after waiting for a predetermined number of consecutive in-water readings, which must vary by a predetermined percentage before turning the device back on.

The apparatus according to the present invention may also take the form of the probe control having such a foam detecting conductance microcontroller module for performing the steps in the method described above, as well as a boiler device itself having such a probe control with such a module for performing the same.

In one particular embodiment, the present invention may be used in a device such as a boiler or other suitable device for boiling water. In operation, the foam detecting conductance microcontroller module measures the resistance of the electrical path from the probe through the boiler water to a ground reference. As the water level changes or foams, the resistance readings vary. The foam detecting conductance microcontroller module looks at this variation, and makes a decision to shut the burner off based on the volatility/variability of the resistance readings. For example, the method may include an algorithm that looks for 5 consecutive readings, which deviate more than 6% between consecutive readings. The foam detecting conductance microcontroller module may also look for a total of 10 readings out-of-water condition within a rolling 15-second period. If either of these two conditions exists, the foam detecting conductance microcontroller module will shut the boiler or burner off. Then the foam detecting conductance microcontroller waits for 15 consecutive in-water readings, which must vary less than 6% before turning the burner back on.

One advantage of the present invention is that it improves upon current conductance level detection by providing a means to be more robust in a situation with foaming and unstable water lines, for example, by letting the process run continuously, as long as the liquid level is adequate.

Another advantage of the present invention is that it can also be used to determine the location/presence of the water line and the fluid without-having to turn off the heater.

BRIEF DESCRIPTION OF THE DRAWING

The drawing, not drawn to scale, includes the following Figures.

DETAILED DESCRIPTION OF INVENTION

Below is a detailed description of one embodiment of the present invention, which is provided by way of example. A person skilled in the art would appreciate that other embodiments may be implemented consistent with that described below and still be within the scope of the present invention.

Figure 3A:
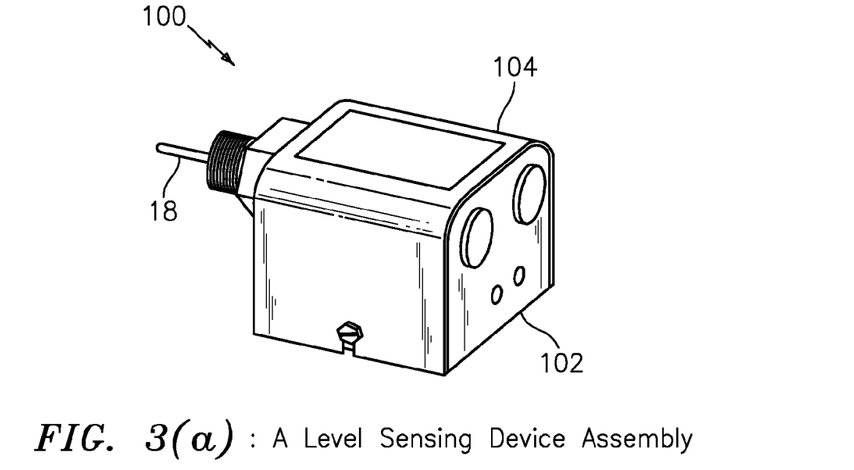
FIGS. 3(a) and (b) illustrate perspective views of an assembly according to an aspect of the present invention.
Figure 3B:
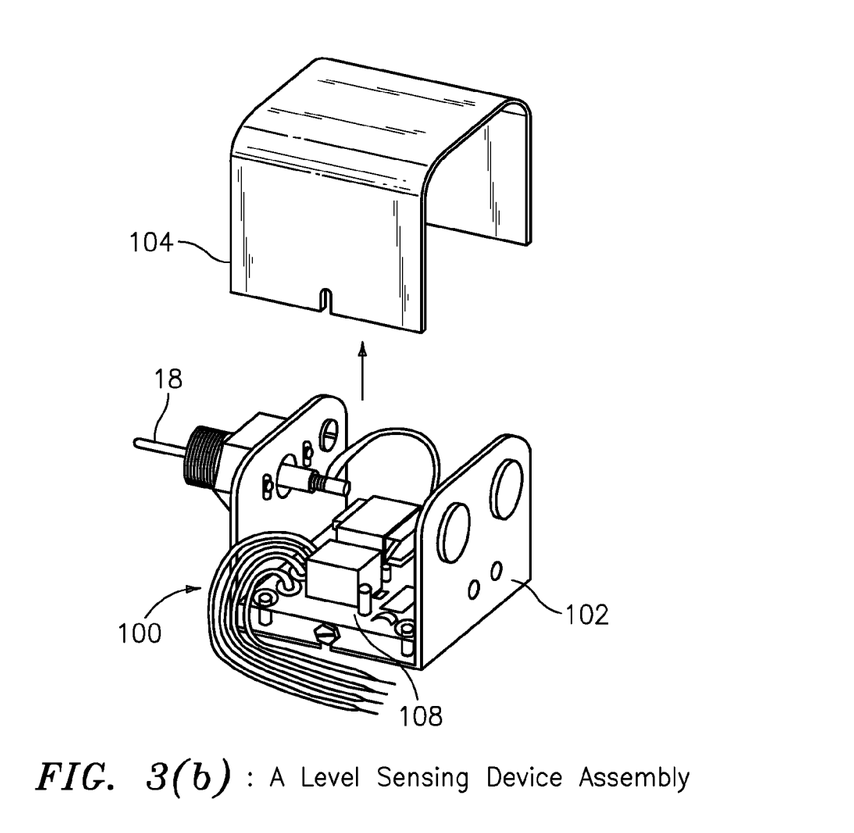

FIGS. 3(a) and (b)

FIGS. 3(a) and 3(b) show a level sensing device assembly generally indicated as 100 according to the present invention, which is similar to that shown in U.S. Pat. No. 6,571,625 and which is hereby incorporated by reference in its entirety. The level sensing device assembly 100 is also known herein as a probe control (see element 34 in FIG. 1) and may be used in conjunction with a device such as a boiler or other suitable device 30 (FIG. 1) for boiling water.

The level sensing device assembly 100 includes a housing 102, a housing cover 104, a conductance probe 18 (FIG. 2(a)), and a circuit board 108 secured within housing 102, as well as other parts that do not form part of the overall invention.

Figure 4:
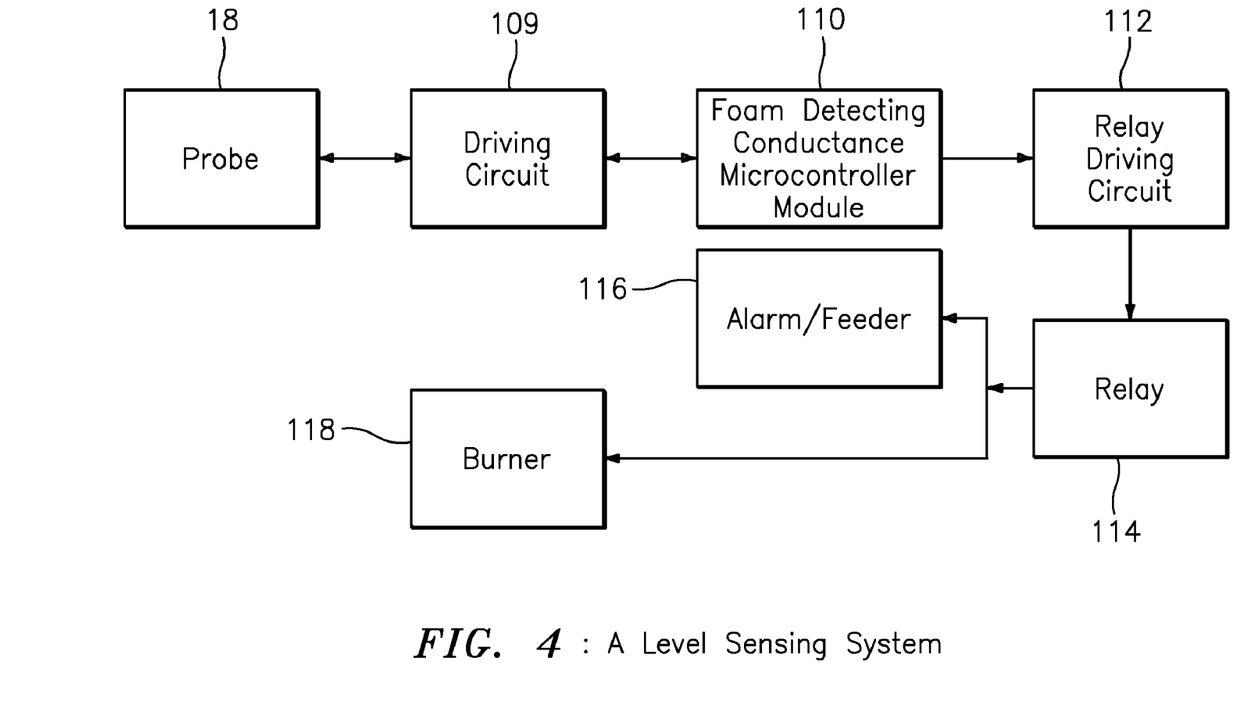
FIG. 4 illustrates a functional block diagram of a fluid level sensing system according to an aspect of the present invention.
Figure 5:
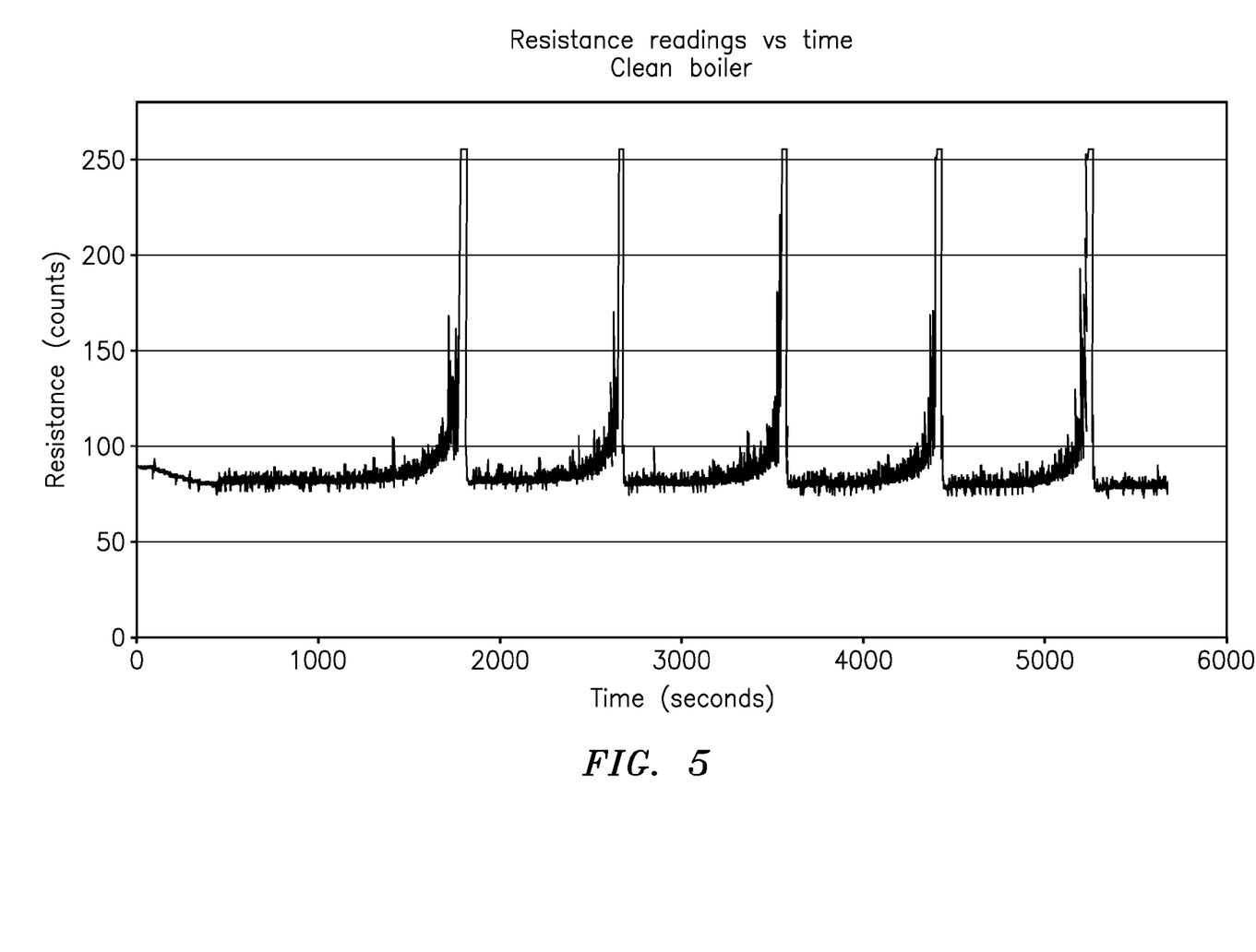
FIG. 5 is a graph of resistance readings in counts versus time in seconds for a clean boiler.
Figure 6:
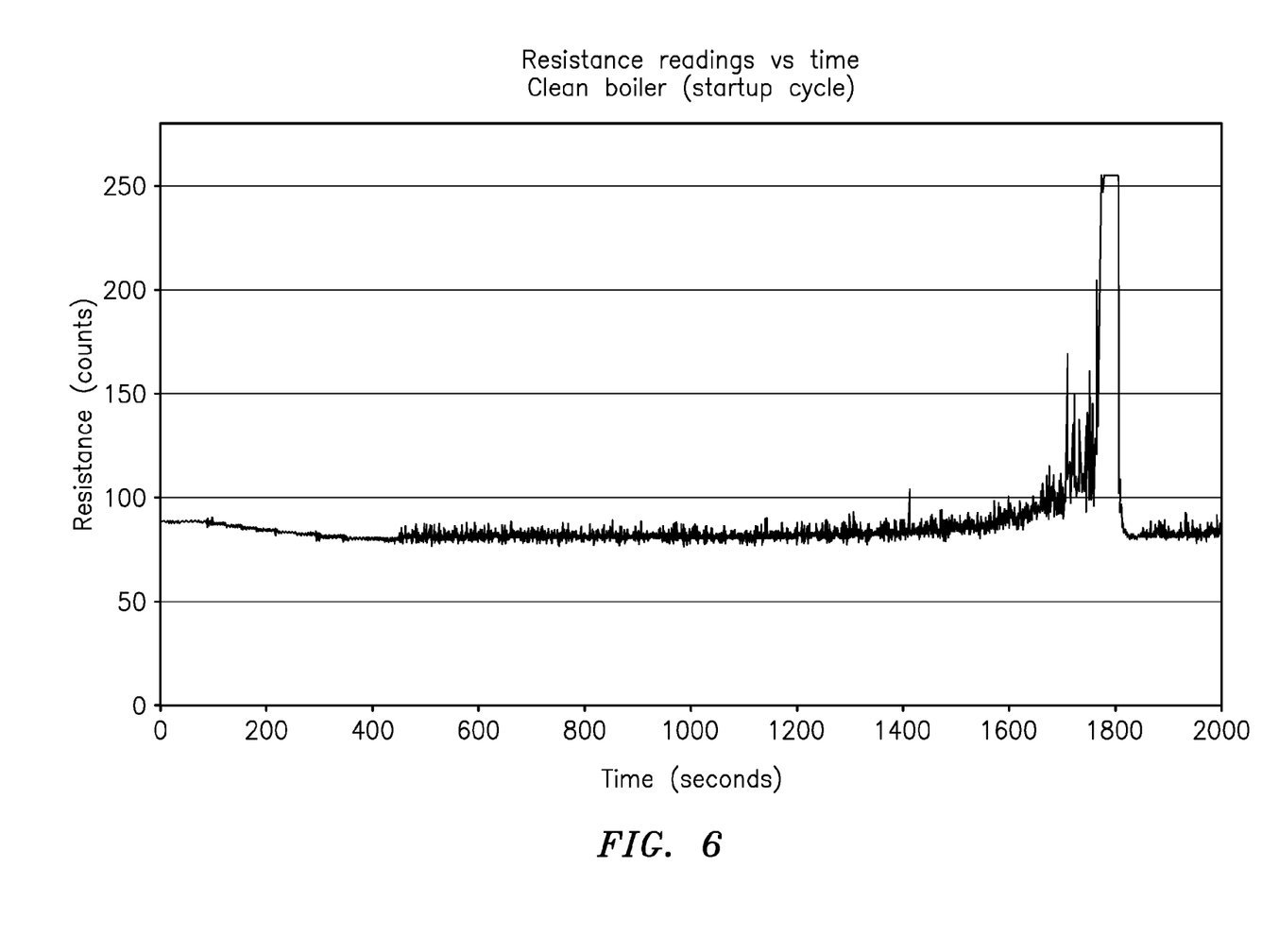
FIG. 6 is a graph of resistance readings in counts versus time in seconds for a clean boiler in the startup cycle.
Figure 7:
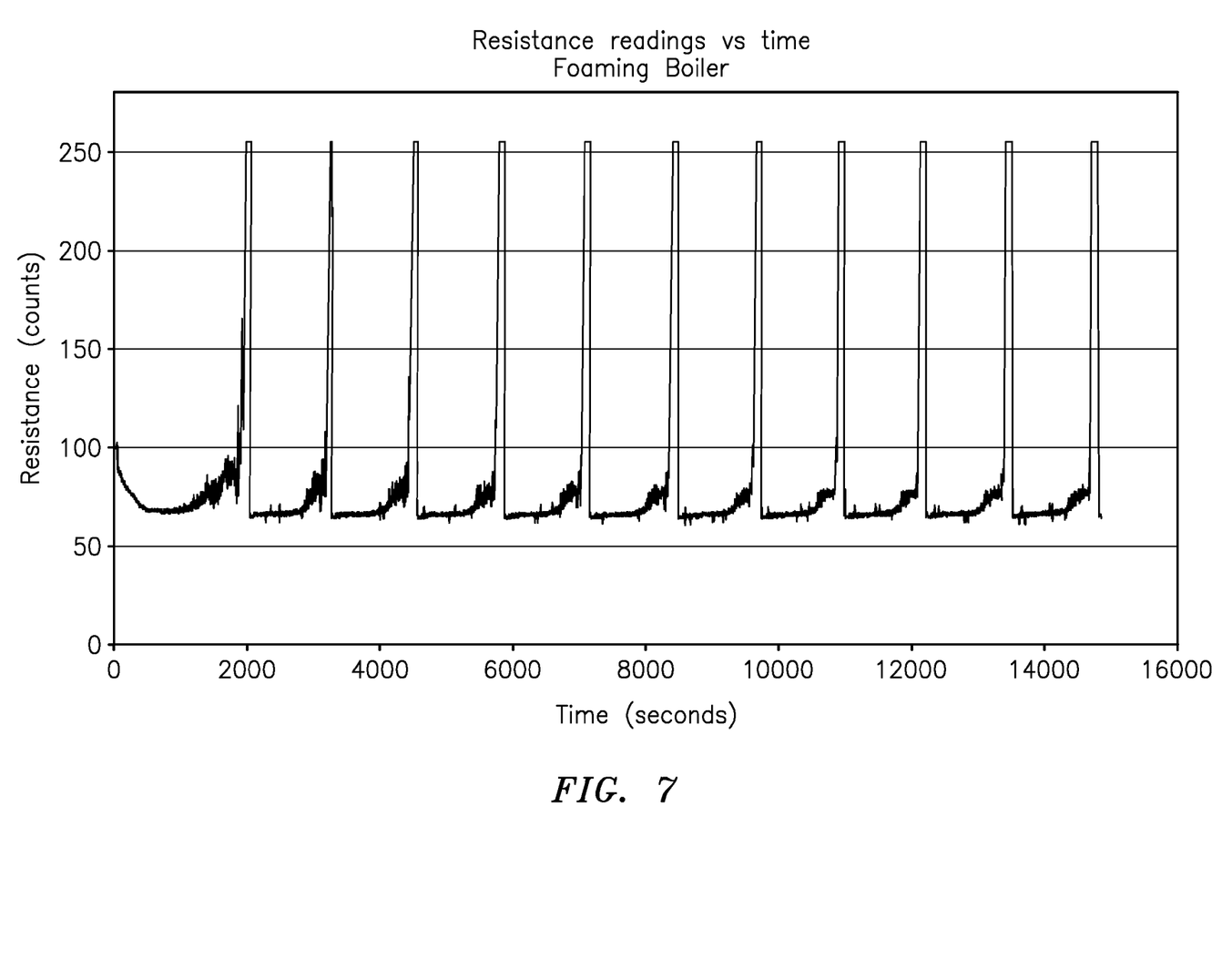
FIG. 7 is a graph of resistance readings in counts versus time in seconds for a foaming boiler.
Figure 8:
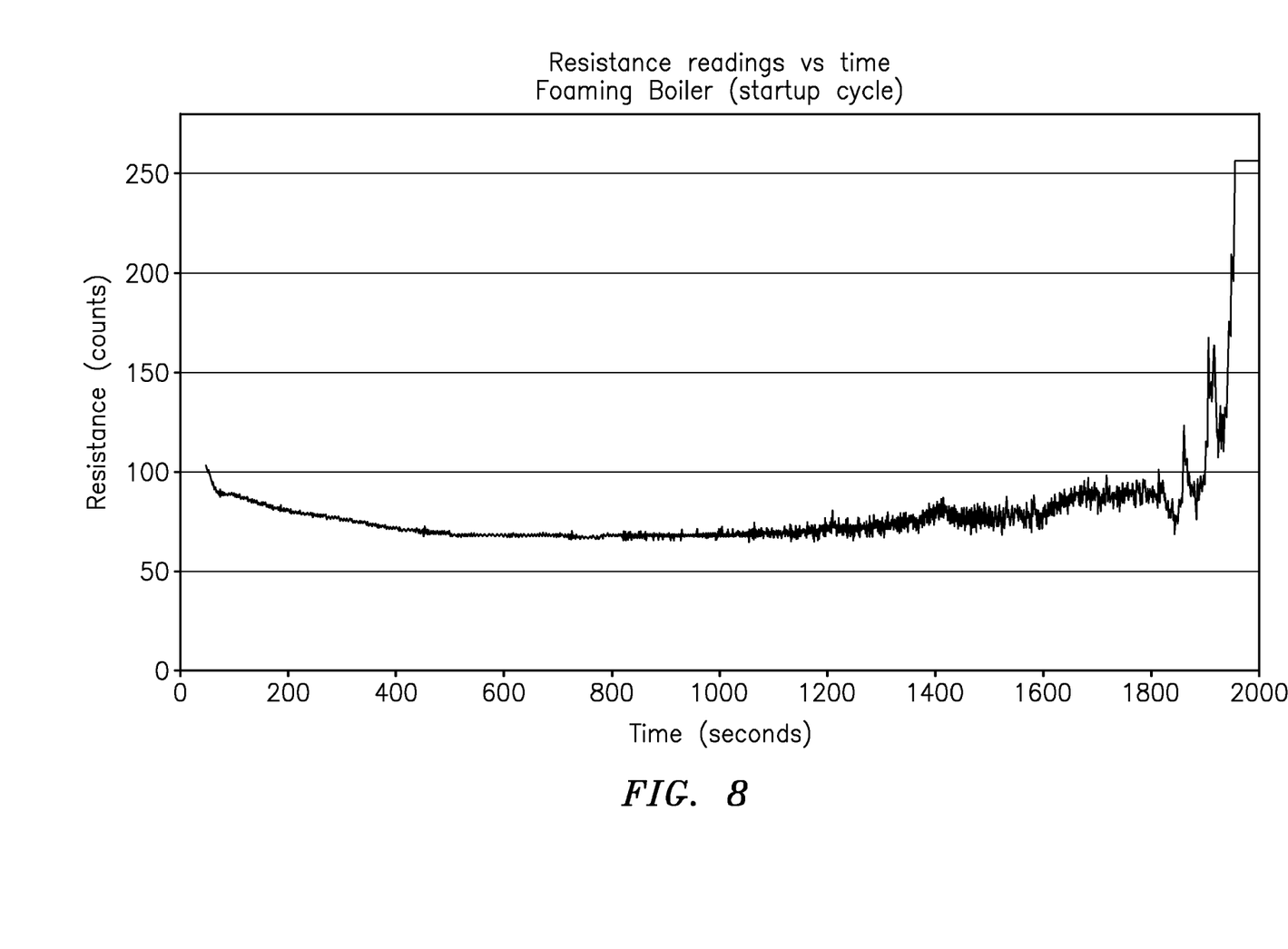
FIG. 8 is a graph of resistance readings in counts versus time in seconds for a foaming boiler in the startup cycle.

FIG. 4 shows the circuit board 108 in greater detail, including a driving circuit 109 and a foam detecting conductance microcontroller module 110 that forms the basic part of the overall invention consistent with that discussed below, optionally, the probe control 100 may further include a relay driving circuit 112 and a relay 114 which can be used to activate an alarm or other feeder circuit 116 or a burner control circuit 118, for example. The use of alarms and burner controls have long been used in connection with fluid level sensors. As shown, the probe 18 is interconnected with the driving circuit 109. The foam detecting conductance microcontroller module 110 is interconnected with the driving circuit 11, as well as with a relay driving circuit 112. The relay driving circuit 112 in turn is interconnected with and activates relay 114, which is in turn interconnected with and activates the alarm or feeder circuit 116 or burner control circuit 118, for example. The elements 18, 109, 112, 114, 116 and 118 are known in the art, and the scope of the invention is not intended to be limited to any particular type or kind thereof. Moreover, the basic cooperation of these elements is described in greater detail in U.S. Pat. No. 6,571,625, and a person skilled in the art would appreciate the cooperation of these elements in conjunction with the foam detecting conductance microcontroller module 110 consistent with that discussed below.

Basic Operation of the Foam Detecting Conductance Microcontroller Module 110

According to the present invention, the foam detecting conductance microcontroller module 110 in FIG. 4 operates as follows:

Shutdown

In a boiler such as 30 in FIG. 1, the foam detecting conductance microcontroller module 110 measures the resistance of the electrical path from the conductance probe 18 through the boiler water to a ground reference. As the boiler water level changes or foams, the resistance readings vary. The foam detecting conductance microcontroller module 110 looks at this variation, and makes a decision to shut the boiler or burner 30 off based on a predetermined difference between two or more resistance readings. In one particular case, the foam detecting conductance microcontroller module 110 may make a decision to shut the burner 30 off based on the volatility/variability of the resistance readings, that may be derived from an algorithm that looks, for example, for a predetermined number of consecutive readings, which deviate more than a predetermined percentage between consecutive readings. In one embodiment shown and described herein, the predetermined number of consecutive readings is 5, although the scope of the invention is not intended to be limited to the same consistent with that discussed below. In one embodiment shown and described herein, the predetermined percentage is 6%, although the scope of the invention is not intended to be limited to the same consistent with that discussed below. The foam detecting conductance microcontroller module 110 may also look for a predetermined total of readings of an out-of-water condition within a predetermined rolling period of time. If either of these two conditions exists, then the foam detecting conductance microcontroller module 110 will shut the burner 30 off. In one embodiment shown and described herein, the predetermined total of readings of the out-of-water condition is 10, although the scope of the invention is not intended to be limited to the same consistent with that discussed below. In one embodiment shown and described herein, the predetermined rolling period of time is 15 second, although the scope of the invention is not intended to be limited to the same consistent with that discussed below.

Restart

After the boiler 30 is turned off, the foam detecting conductance microcontroller module 110 may wait for a predetermined number of consecutive in-water readings, which must vary less than a predetermined percentage before turning the boiler 30 back on. In one embodiment shown and described herein, the predetermined number of consecutive in-water readings is 15, although the scope of the invention is not intended to be limited to the same consistent with that discussed below. In one embodiment shown and described herein, the predetermined percentage is 6%, although the scope of the invention is not intended to be limited to the same consistent with that discussed below.

The Number of Readings and Percentage Deviation

Consistent with that described above, it is important to note that the number of consecutive readings, the particular deviation between the consecutive readings, the readings out-of-water condition, and the rolling predetermined period, are provided above by way of example. The scope of the invention is not intended to be limited to any particular number of consecutive readings, any particular deviation between the consecutive readings, any particular number of readings out-of-water condition, or any particular rolling predetermined period. For example, embodiments are envisioned in which the number of consecutive readings is 4 or less, or 6 or more, and the deviation between the consecutive readings of 5% or less, or 7% or more, as well as the number of readings out-of-water condition being 9 or less, or 11 or more, and the rolling predetermined period being 14 or less, or 16 or more, seconds, or some combination of these parameters.

It is important to note that the consecutive in-water readings and the deviation before turning the boiler 30 back on are provided above by way of example. The scope of the invention is not intended to be limited to any particular number of consecutive in-water readings, or any particular deviation between the consecutive readings. For example, embodiments are envisioned in which the number of consecutive in-water readings is 14 or less, or 16 or more, and the deviation between the consecutive readings of 5% or less, or 7% or more, or some combination of these parameters.

One Implementation of the Foam Detecting Conductance Microcontroller Module 110

The functionality of the foam detecting conductance microcontroller module 110 shown in FIG. 4 may be implemented using hardware, software, firmware, or a combination thereof in order to shut off the device according to the present invention. In a typical software implementation, the module 110 would be one or more microprocessor-based architectures having a microprocessor, a random access memory (RAM), a read only memory (ROM), input/output devices and control, data and address buses connecting the same. A person skilled in the art of programming would be able to program such a microprocessor-based implementation to perform the functionality described herein without undue experimentation. The scope of the invention is not intended to be limited to any particular implementation using technology known or later developed in the future.

FIGS. 5-10

FIGS. 5-8 provide graphs of resistance readings in counts versus time in seconds for a clean boiler, for a clean boiler in the startup cycle, for a foaming boiler, for a foaming boiler in the startup cycle.

Figure 9:
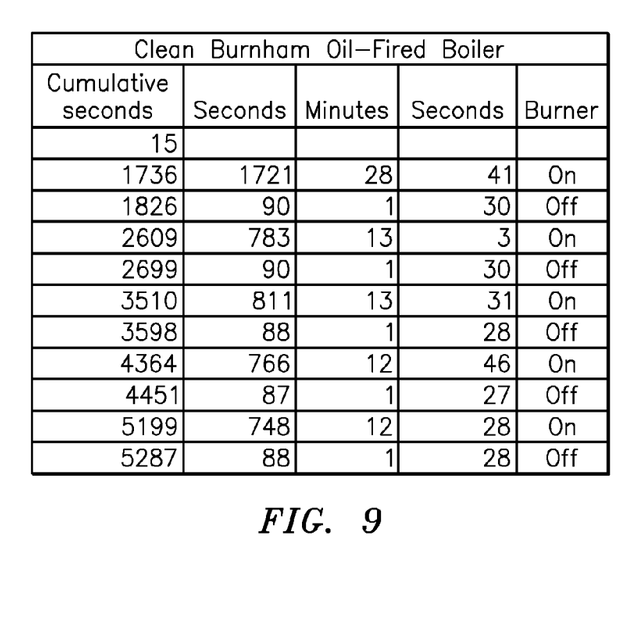
FIG. 9 is a chart of data of a clean oil-fired boiler turning on and off.
Figure 10:
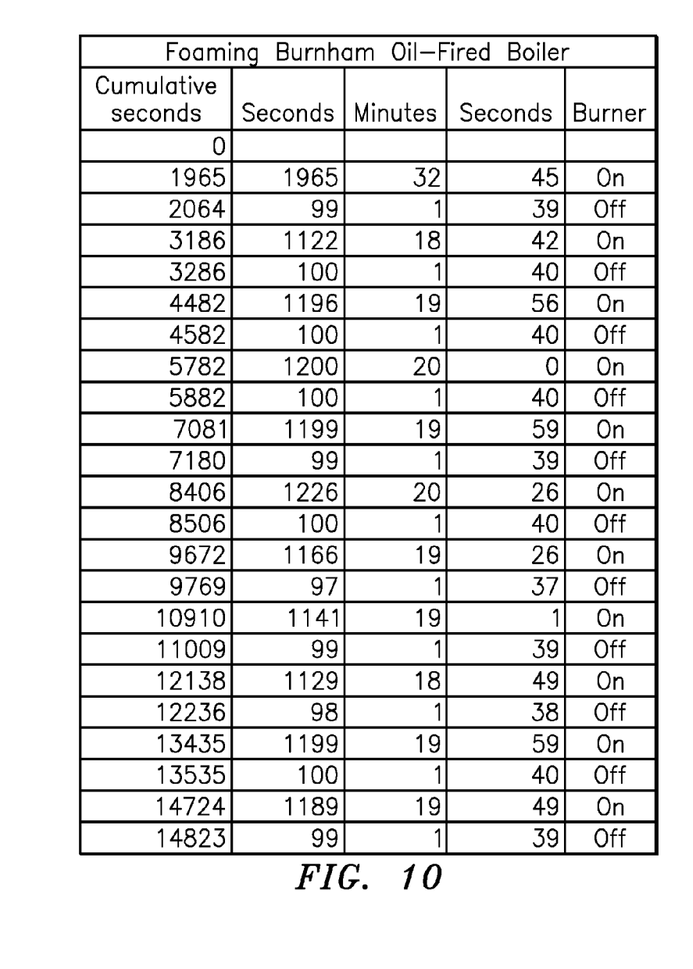
FIG. 10 is a chart of data of a foaming oil-fired boiler turning on and off.

FIGS. 9-10 provide charts of data of a clean oil-fired boiler turning on and off and of a foaming oil-fired boiler turning on and off.

Scope of the Invention

Accordingly, the invention comprises the features of construction, combination of elements, and arrangement of parts which will be exemplified in the construction hereinafter set forth.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

What is claimed is:

1. A probe control for operating a device having a container with fluid therein, comprising:

a conductance microcontroller module, responsive to an electrical signal containing information about a resistance of an electrical path from a probe through the fluid to a ground resistance is measured, for shutting off the device based on a predetermined number or total of consecutive resistance readings of an out-of-water condition within a predetermined rolling period of time, each out-of-water condition being determined by a deviation of more than a predetermined small percentage between respective consecutive resistance readings indicative of foam or an unstable fluid line being detected in the fluid, and the predetermined number or total of readings including two or more pairs of the consecutive resistance readings.

2. A probe control according to claim 1, wherein the predetermined small percentage is about 6%.

3. A probe control according to claim 1, wherein the predetermined number of consecutive resistance readings is about 5.

4. A probe control according to claim 3, wherein the predetermined number is about 10.

5. A probe control according to claim 3, wherein the predetermined time is a rolling 15 second period.

6. A probe control according to claim 1, wherein the conductance microcontroller module also waits for a predetermined number of consecutive in-water readings, which must vary a predetermined percentage before turning the device back on.

7. A probe control according to claim 6, wherein the predetermined percentage is about 6%.

8. A probe control according to claim 6, wherein the predetermined number of consecutive in-water readings is about 15.

9. A probe control according to claim 1, wherein the device is a steam boiler for boiling water in the container.

10. A method for operating a device having a container with fluid therein, comprising:

measuring a resistance of an electrical path from a probe through the fluid to a ground resistance; and shutting off the device based on a predetermined number or total of consecutive resistance readings of an out-of-water condition within a predetermined rolling period of time, each out-of-water condition being determined by a deviation of more than a predetermined small percentage between respective consecutive resistance readings indicative of foam or an unstable fluid line being detected in the fluid, and the predetermined number or total of readings including two or more pairs of the consecutive resistance readings.

11. A method according to claim 10, wherein the predetermined small percentage is about 6%.

12. A method according to claim 10, wherein the predetermined number of consecutive resistance readings is about 5.

13. A method according to claim 12, wherein the predetermined number is about 10.

14. A method according to claim 12, wherein the predetermined time is a rolling 15 second period.

15. A method according to claim 10, wherein the method comprises waiting for a predetermined number of consecutive in-water readings, which must vary a predetermined percentage before turning the device back on.

16. A method according to claim 15, wherein the predetermined percentage is about 6%.

17. A method according to claim 15, wherein the predetermined number of consecutive in-water readings is about 15.

18. A method according to claim 10, wherein the device is a steam boiler for boiling water in the container.

19. A device being operated by a probe control and having a container with fluid therein, wherein the probe control comprises a conductance microcontroller module that responds to an electrical signal containing information about a resistance of an electrical path from a probe through the fluid to a ground resistance is measured, and shuts off the device based on a predetermined number or total of consecutive resistance readings of an out-of-water condition within a predetermined rolling period of time, each out-of-water condition being determined by a deviation of more than a predetermined small percentage between respective consecutive resistance readings indicative of foam or an unstable fluid line being detected in the fluid, and the predetermined number or total of readings including two or more of the consecutive resistance readings.

20. A device according to claim 19, wherein the predetermined small percentage is about 6%.

21. A device according to claim 19, wherein the predetermined number of consecutive resistance readings is about 5.

22. A device according to claim 21, wherein the predetermined number is about 10.

23. A device according to claim 21, wherein the predetermined time is a rolling 15 second period.

24. A device according to claim 19, wherein the conductance microcontroller module also waits for a predetermined number of consecutive in-water readings, which must vary a predetermined percentage before turning the device back on.

25. A device according to claim 24, wherein the predetermined percentage is about 6%.

26. A device according to claim 24, wherein the predetermined number of consecutive in-water readings is about 15.

27. A device according to claim 19, wherein the device is a steam boiler for boiling water in the container.

* * * * *